United States Patent
Hopt et al.

(10) Patent No.: US 6,604,678 B2
(45) Date of Patent: Aug. 12, 2003

(54) CARD READER WITH FEED ROLLERS MOUNTED ON PIVOT ARMS

(75) Inventors: Jürgen Hopt, Rottweil (DE); Karl-Rudolf Hopt, Rottweil (DE); Michael Storz, Constance (DE)

(73) Assignee: ddm hopt + schuler GmbH & Co. KG (DE)

( * ) Notice: Subject to any disclaimer, the term of this patent is extended or adjusted under 35 U.S.C. 154(b) by 0 days.

(21) Appl. No.: 10/150,356

(22) Filed: May 17, 2002

(65) Prior Publication Data

US 2003/0019940 A1 Jan. 30, 2003

(30) Foreign Application Priority Data

Jun. 22, 2001 (EP) ............................................. 01115229

(51) Int. Cl.[7] .............................................. G06K 13/00
(52) U.S. Cl. ....................................................... 234/475
(58) Field of Search ................................ 235/475, 480, 235/481, 482, 486, 487, 492

(56) References Cited

U.S. PATENT DOCUMENTS

| | | | | |
|---|---|---|---|---|
| 4,377,828 A | * | 3/1983 | Hayman et al. | 360/88 |
| 4,612,436 A | * | 9/1986 | Okada | 235/449 |
| 4,684,794 A | | 8/1987 | Holland-Letz | |
| 4,864,114 A | * | 9/1989 | Eriane et al. | 235/480 |
| 5,264,688 A | * | 11/1993 | Matsuno et al. | 235/480 |
| 5,646,392 A | * | 7/1997 | Oguchi | 235/475 |
| 6,068,187 A | * | 5/2000 | Momose | 235/449 |

\* cited by examiner

*Primary Examiner*—Karl D. Frech
*Assistant Examiner*—Edwyn Labaze
(74) *Attorney, Agent, or Firm*—Walter A. Hackler

(57) ABSTRACT

A card reader (1) with three rollers (4, 5, 6) mounted on pivot arms (10, 11, 12, 13) and which are disposed serially in the direction (2) of card insertion, the pivot arms (10, 11, 12, 13) being pivotable in a plane at right-angles to the card path against the action of a restoring force and being coupled to one another for movement, the roller (4) which is at the rear in the direction (2) of insertion being disposed on a rear pivot arm (10) behind its pivot axis (15) while the roller (6) which is at the front in the direction (2) of insertion is disposed on a front pivot arm (13) in front of its pivot axis (16), comprises two middle pivot arms (11, 12) which are articulatingly connected to each other, one middle pivot arm (11) being disposed at a distance from its pivot axis (17) with the rear pivot arm (10) while the other middle pivot arm (12) is articulatingly connected to the front pivot arm (13) at a distance from its pivot axis (19).

18 Claims, 2 Drawing Sheets

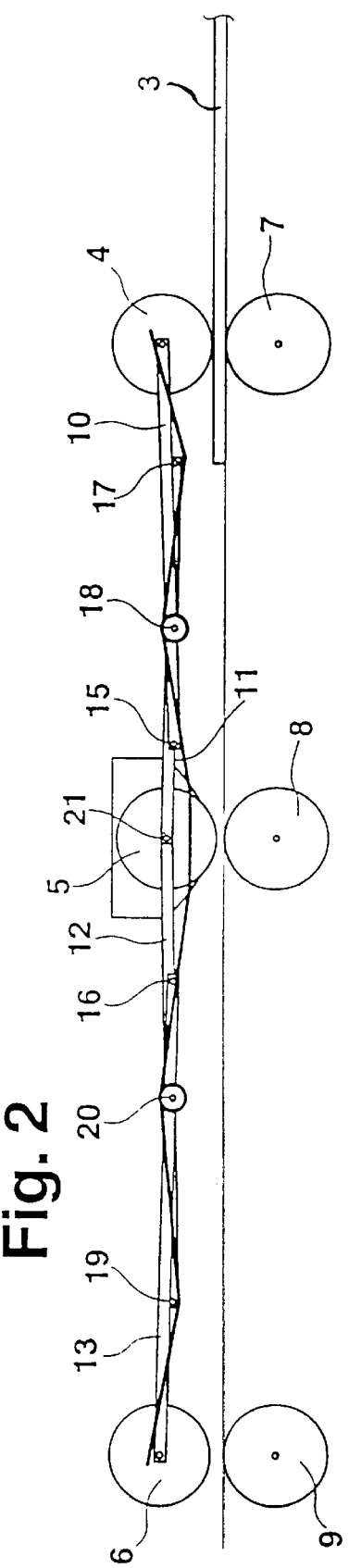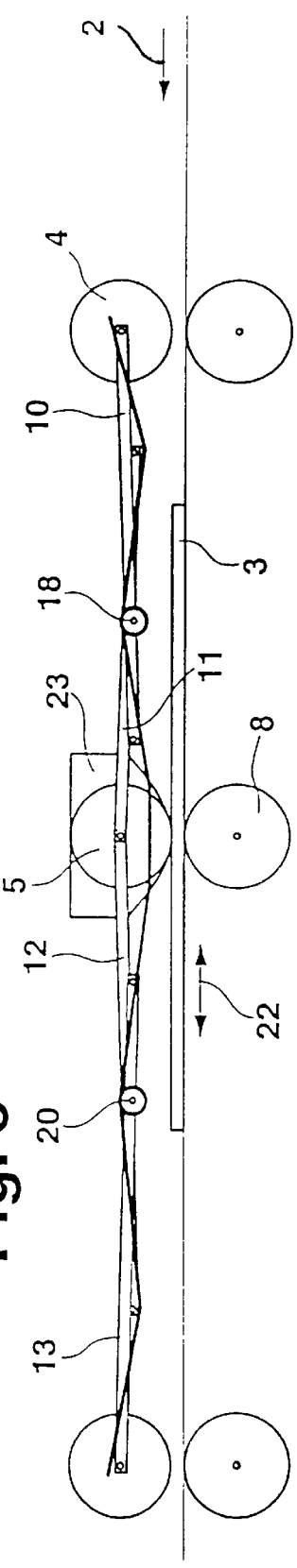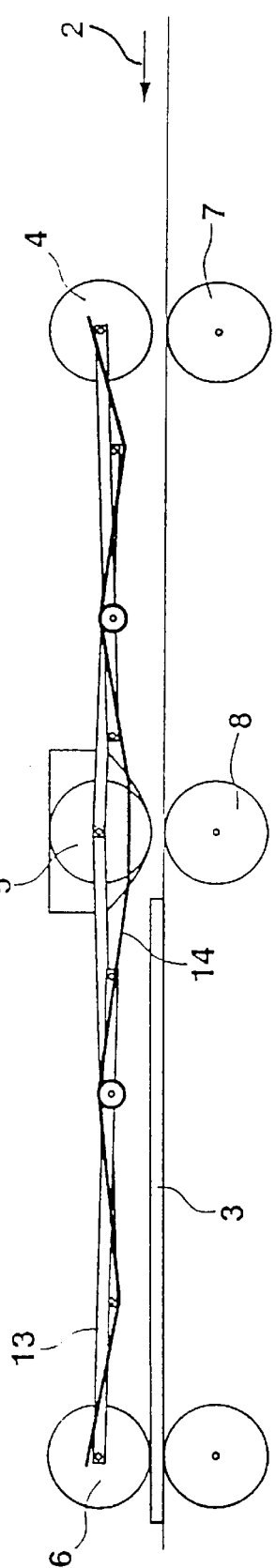

CARD READER WITH FEED ROLLERS MOUNTED ON PIVOT ARMS

BACKGROUND OF THE INVENTION

The invention relates to a card reader with three feed rollers mounted on pivot arms and which are serially disposed in the direction of card insertion, the pivot arms being coupled for movement with one another and being pivotable in a plane at right-angles to the card path against the action of a restoring force and whereby the feed roller which is at the rear in the direction of insertion is disposed on a rear pivot arm behind its pivot axis and in that the feed roller which is in front in the direction of insertion is disposed on a forward pivot arm in front of its pivot axis.

Such a card reader is known for example from DE 200 02 405.1 U1.

This prior art card reader comprises three feed rollers disposed one after another in the direction of card insertion and also two pivot arms which are pivotable in each case in a plane at right-angles to the card path and against the action of restoring springs. Between their pivot axes, the two pivot arms are connected to each other articulatingly via a common pivot axis and are therefore coupled together for movement in opposite directions. The feed roller which is in front and that which is behind in the direction of insertion are in each case mounted on the free end of the two pivot arms whereas the middle feed roller is mounted to rotate about the common pivot axis. When the card is being driven by the middle feed roller, the other two feed rollers are raised by more than the thickness of the card and are therefore pivoted completely out of the card path. Driven solely by the middle feed roller, the card is able to pass by a write/read head for data exchange without the other two feed rollers hampering this movement.

The lever ratio of middle to rear feed roller in the case of the known card reader amounts to 1:3.5, i.e. for a middle feed roller travel of 1 mm, the travel of the rear feed roller amounts to approximately 3 mm. In the case of a given pressure weight of the middle feed roller on its mating roller of 1000 g, the pressure weight of the rear feed on its mating roller amounts to only about 300 g. In the case of cards which are transversely curved, i.e. about their longitudinal central axis, this minimal weight of pressure of the rear feed roller is insufficient to ensure trouble-free feed of the card by means of the rear feed roller.

In the case of a card reader of the type mentioned at the outset, the problem on which the invention is based is that of enhancing the pressure weight which acts on an inserted card by the rear feed roller.

SUMMARY OF THE INVENTION

According to the invention, this problem is resolved by two middle pivot arms which are articulatingly connected to each other, one middle pivot arm being, at a distance from its pivot axis, connected articulatingly to the rear pivot arm while the other middle pivot arm is articulatingly connected to the front pivot arm at a distance from its pivot axis.

The advantage achieved by the invention resides in the fact that a lesser lever ratio of middle to rear feed roller of for example 1:1.5 can be achieved. In this exemplary case, in the case of a travel by the middle feed roller of 1 mm the travel of the rear feed roller is about 1.5 mm and for a given weight of pressure of the middle feed roller on its mating roller of 1000 g, the pressure weight of the rear feed on its mating roller is about 750 g. As a result of this high weight which is applied by the rear feed roller, perfect transport is ensured by means of the rear feed roller even in the case of cards which are tremendously transversely curved.

In the case of particularly preferred embodiments of the invention, the two middle pivot arms are articulatingly connected to each other between the pivot axes of the rear and of the front pivot arms. In this respect, the middle feed roller is mounted between the pivot axes of the front and of the rear pivot arm and in fact either only on one of the two middle pivot arms or on both middle pivot arms about the axes of rotation of their articulating connection.

Preferably, a read and/or write head of the card reader is provided in the region of the middle feed roller. This measure has the advantage that, driven only by the middle feed roller, the card can be passed by the read and/or write head equally in both directions and with a clearly defined application pressure.

The restoring force can be constituted for example by one or more restoring springs acting in each case on articulating connections between the pivot arm and/or on restoring springs acting on feed rollers so that the feed rollers are initially tensioned in their positions which engage the card path.

Preferably, only a single restoring spring is provided which is at the bottom biased on the pivot axes of the pivot arms and at the top bears on the pivot axes of the articulating connections of the rear and front pivot arms as well as on the rear and front feed roller. To this end, a restoring spring constituted by one wire is threaded in between the axes of the feed rollers, pivot arms and articulating connections.

Furthermore, on the side of the card path which is opposite the feed rollers, in each case one mating roller is associated with each feed roller as a mating mounting for the card which is to be transported.

Further advantages of the invention will arise from the description and from the drawings. Equally, the aforementioned and features which still have to be mentioned are in accordance with the invention capable of being used individually, by themselves or in any desired combination. The embodiments shown and described are not to be understood as a conclusive enumeration but rather more have a character of exemplifying the invention.

In the drawings:

FIG. 2 shows the card reader in FIG. 1, the card being fed by the rear feed roller;

FIG. 3 shows the card reader in FIG. 1, the card being fed by the middle feed roller, and FIG. 4 shows the card reader in FIG. 1, the card being fed by the feed roller which is in front in the direction of insertion.

BRIEF DESCRIPTION OF THE PREFERRED EMBODIMENT

Figure 1:
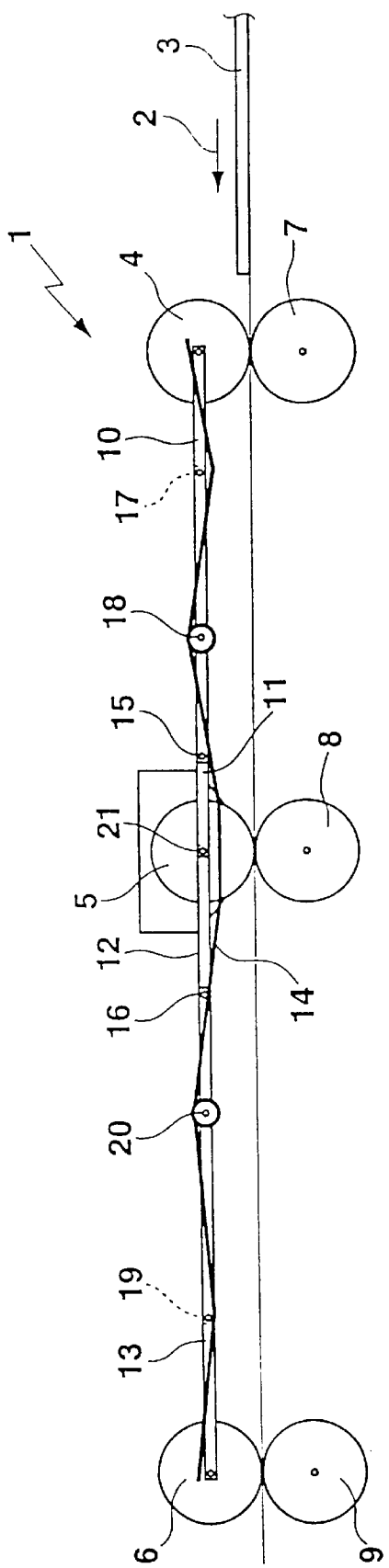
FIG. 1 shows the card reader according to the invention with three feed rollers, a card not yet having been acquired by the feed roller which is at the rear in the direction of insertion.

The card reader 1 diagrammatically shown in FIG. 1 comprises, disposed one after the other in the direction 2 of insertion of the card 3, three serially disposed feed rollers 4, 5, 6 by means of which the card 3 can be transported in and against the insertion direction 2. On the side of the card path opposite the feed rollers 4, 5, 6 there are in each case mating rollers 7, 8, 9 which serve as fixed mounting bearings for the transported card 3. The three feed rollers 4, 5, 6 are coupled to one another for movement by pivot arms 10, 11, 12, 13 which are in each case pivotable in a plane at right-angles to the card path and against the action of a restoring spring 14.

The feed roller 4 which is at the rear in the insertion direction 2 is at the free end of the rearwardly extending rear pivot arm 10 and behind its fixed pivot axis 15 and the feed roller 6 which is in front in the insertion direction 2 is mounted on the free end of the forwardly extending front pivot arm 13 and in front of its fixed pivot axis 16. The feed rollers, 4, 6 are in each case spaced apart by the pivot axes 15, 16 of their pivot arms 10, 13. A forwardly extending middle pivot arm 11 is, at a distance from its fixed pivot axis 17, articulatingly connected to the rear pivot arm 10 between its pivot axis 15 and rear feed roller 4 at 18. A further rearwardly extending middle pivot arm 12 is, at a distance from its fixed pivot axis 19, connected to the forward pivot arm 13 between its pivot axis 16 and front feed roller 6 at 20 in articulating fashion. The two middle pivot arms 11, 12 are, at their mutually facing free ends and in fact between the pivot axes 15, 16 of the rear and front pivot arms 10, 13 articulatingly connected to each other at 21. Mounted about the pivot axis of this articulating connection 21 is also the middle feed roller 5.

As long as the card 3 has not yet been inserted into the card reader 1 as far as the rear feed roller 4, the feed rollers 4, 5, 6 are subject to the force of the restoring spring 14 at their mating rollers 7, 8, 9 (FIG. 1). The restoring spring 14 formed of wire is at the bottom biased on the fixed pivot axes 15, 16, 17, 19 of the pivot arms 10, 11, 12, 13 while at the top it bears both on the pivot axes of the articulating connections 18, 20 as well as on the rear and front rollers 4, 6, whereby the restoring spring 14 is wound once around the pivot axes of the articulating connections 18, 20 and is therefore positionally fixed.

Upon introduction of the card 3 between the rear feed roller 4 and its mating roller 7, the rear pivot arm 10 is pivoted about its pivot axis 15 and against the clockwise direction until the rear feed roller 4 has been raised from its mating roller 7 by the thickness of the card. By reason of the articulating connection 18, with the rear pivot arm 10, also the middle pivot arm 11 is pivoted about its pivot axis 17 in a clockwise direction and therefore the middle feed roller 5 is lifted off its mating roller 8 certainly by less than the card thickness. By virtue of the articulating connection 21, along with the middle pivot arm 11, also the other middle pivot arm 12 is pivoted in an anti-clockwise direction about its pivot axis 19 and so, by virtue of the articulating connection 20, also the front pivot arm 13 is pivoted in a clockwise direction about its pivot axis 16. Consequently, the front feed roller 6 is also lifted off its mating roller 9 (FIG. 2).

Driven by the rear feed roller 4, the card 3 is transported onwards in the insertion direction 2 until it arrives between the middle feed roller 5 and its mating roller 8. Consequently, the middle pivot arm 11 is pivoted in a clockwise direction while the middle pivot arm 12 is pivoted in an anti-clockwise direction still further until the middle feed roller 5 is being lifted off its mating roller 8 by the thickness of the card. Since, by virtue of the articulating connections 18, 20 with the middle pivot arms 11, 12, also the rear pivot arm 10 is further pivoted in an anti-clockwise direction while the front pivot arm 13 is pivoted in the clockwise direction, the front and rear feed rollers 4, 6 are in each case lifted by more than the card thickness sand are thus pivoted completely out of the path of the card. Driven solely by the middle feed roller 5, the card 3 can be moved in and against the insertion direction 2 (double headed arrow 22), past a write/read head 23 for data exchange without the front and rear feed roller 4, 6 hampering this movement (FIG. 3). The write/read head 23 is disposed laterally beside the middle feed roller 5 and opposite the mating roller 8.

As soon as the card 3 which has been onwards transported by the in-feed means 2 is no longer between the middle feed roller 5 and the mating roller 8, the front pivot arm 13 pivots under the action of the restoring spring 14 in an anti-clockwise direction and backwards sufficiently for the front feed roller 6 to rest on the card 3 so that it is only lifted by the thickness of the card. As a result of the motional coupling of the pivot arms, together with the front feed roller 6, also the two other feed rollers 4, 5 are not lifted off their mating rollers 7, 8 (FIG. 4).

We claim:

1. A card reader comprising: three feed rollers mounted on pivot arms and which are serially disposed in the direction of card insertion, the pivot arms being coupled for movement with one another and being pivotable in a plane at right-angles to a card path against an action of a restoring force, wherein a feed roller which is at a rear in the direction of insertion is disposed on a rear pivot arm behind a respective pivot axis and a feed roller which is in front in a direction of insertion is disposed on a forward pivot arm in front to a respective pivot axis, and wherein two middle pivot arms are articulatingly connected to each other, one middle pivot arm being, at a distance from a respective pivot axis, connected articulatingly to the rear pivot arm while the other middle pivot arm is articulatingly connected to the front pivot arm at a distance from a respective pivot axis.

2. The card reader according to claim 1, wherein the two middle pivot arms are articulatingly connected to each other between the pivot axis of the rear and front pivot arms.

3. The card reader according to claim 1, wherein the two middle pivot arms are connected to each other via the pivot axis of the middle feed roller.

4. The card reader according to claim 1, wherein the middle feed roller is mounted only on one of the two middle pivot arms.

5. The card reader according to claim 1, wherein a read and/or write head of the card reader is provided in a region of the middle feed roller.

6. The card reader according to claim 5, wherein the two middle pivot arms are articulatingly connected to each other between the pivot axis of the rear and front pivot arms.

7. The card reader according to claim 5, wherein the two middle pivot arms are connected to each other via the pivot axis of the middle feed roller.

8. The card reader according to claim 1, wherein the restoring force is provided by one or more restoring springs acting on articulating connections of the pivot arms and/or on feed rollers.

9. The card reader according to claim 8, wherein a single restoring spring is at the bottom biased on the pivot axes of the pivot arms and at the top it bears on the pivot axes of the articulating connections of the rear and front pivot arms and on the rear and front feed rollers.

10. The card reader according to claim 9, wherein the two middle pivot arms are connected to each other via the pivot axis of the middle feed roller.

11. The card reader according to claim 8, wherein the two middle pivot arms are articulatingly connected to each other between the pivot axes of the rear and front pivot arms.

12. The card reader according to claim 1, wherein on the side of the card path of each feed roller which is opposite the rollers there is in each case a mating roller which serves as a mating bearing for the card which is being transported.

13. The card reader according to claim 12, wherein the two middle pivot arms are articulatingly connected to each other between the pivot axes of the rear and front pivot arms.

14. The card reader according to claim 12, wherein the two middle pivot arms are connected to each other via the pivot axis of the middle feed roller.

15. The card reader according to claim 12, wherein the restoring force is provided by one or more restoring springs acting on articulating connections of the pivot arms and/or on feed rollers.

16. The card reader according to claim 1, wherein the two middle pivot arms are articulatingly connected to each other between the pivot axes of the rear and front pivot arms, a read and/or write head of the card reader is provided in the region of the middle feed roller, the restoring force is provided by one or more restoring springs acting on articulating connections of the pivot arms and/or on feed rollers, a single restoring spring is at the bottom biased on the pivot axes of the pivot arms and at the top it bears on the pivot axes of the articulating connections of the rear and front pivot arms and on the rear and front feed rollers, and on the side of the card path of each feed roller which is opposite the rollers there is in each case a mating roller which serves as a mating bearing for the card which is being transported.

17. The card reader according to claim 16, wherein the middle pivot arms are connected to each other via the pivot axis of the middle feed roller.

18. The card reader according to claim 16, wherein the middle feeder is mounted only on one of the two middle pivot arms.

* * * * *